United States Patent [19]

Borzym

[11] 4,109,555
[45] Aug. 29, 1978

[54] UNIVERSAL DOUBLE CUT DIE SET

[75] Inventor: Alexander Borzym, Dearborn, Mich.

[73] Assignee: Alpha Industries, Inc., Detroit, Mich.

[21] Appl. No.: 801,059

[22] Filed: May 27, 1977

Related U.S. Application Data

[62] Division of Ser. No. 695,242, Jun. 11, 1976, Pat. No. 4,036,091.

[51] Int. Cl.² .............................................. B26D 7/26
[52] U.S. Cl. ....................................... 83/700; 83/319; 83/618; 83/926 H
[58] Field of Search ...................... 83/319, 700, 926 H, 83/34, 54, 300, 310, 319, 385, 454, 456, 578, 618, 917, 697

[56] References Cited

U.S. PATENT DOCUMENTS

| | | | |
|---|---|---|---|
| 700,053 | 5/1902 | Kendell | 83/700 X |
| 2,374,625 | 4/1945 | Slettengren | 83/700 X |
| 3,148,575 | 9/1964 | Thyng | 83/700 |
| 3,964,360 | 6/1976 | Schwartz | 83/700 X |

Primary Examiner—Willie G. Abercrombie
Attorney, Agent, or Firm—Krass & Young

[57] ABSTRACT

A tubing cutoff die having a horizontally moving scarfing blade and a vertically moving cutoff blade. The tubing being cut off is held in clamping jaws movably mounted on the lower die shoe of the die and actuated by a cam extending from the upper die shoe. The scarfing blade is also mounted for horizontal reciprocation on the lower shoe and actuated by another cam fixed to the upper shoe. The cutoff blade is mounted on the upper die shoe. The two die shoes are reciprocably connected by post and bushing arrangements. There are three of these disposed so that the centerlines are at three of the corners of a rectangle. One of the clamping jaws is mounted on a holder reciprocably mounted on the lower die shoe and the other jaw is mounted on a second holder reciprocably mounted on the first holder. The mounting for the cutoff block provides for either of two rigidly located positions, for different tubing sizes, and the scarfing blade is also adjustable.

2 Claims, 10 Drawing Figures

UNIVERSAL DOUBLE CUT DIE SET

This is a division, of application Ser. No. 695,242, filed June 11, 1976, now U.S. Pat. No. 4,036,091.

This invention is directed to improvements in die sets and including improvements in arrangements for interconnecting and guiding relatively movable parts of die sets. As described herein, in its preferred embodiment the die set is one for cutting off tubing; however, the principles of the invention are applicable to other types of die sets.

One feature of the invention is an arrangement for guiding the two major relatively movable parts or shoes of the die set for reciprocation relative to each other. This is embodied in a set of three guide posts and three guide bushings for the posts, with the axes of the posts located approximately at three corners of a rectangle. Thus, with an arrangement of only three guide posts, the structure is supported so as to be free from likelihood of binding resulting from transverse forces engendered by the transverse component of motion of the ram which drives the die parts together. This fits the die set for use with presses of different types; specifically, those in which the ram has a component of motion along the axis of the tube which is being cut, and those in which the ram has a component of motion transverse to the tube axis.

Another feature lies in an improved structure of the clamp which holds the tubing during the cutting operation. The tube is clamped between two jaws, as is common. In the improved arrangement according to the invention one of these jaws is mounted on a first slide which is reciprocably guided on one die shoe. The other jaw is mounted on a second slide which is reciprocably mounted on the first slide. This promotes a simpler and lighter structure and better alignment of the clamping jaws.

A third feature is an arrangement for clamping the cutoff blade securely and transmitting force to it positively in two settings relative to the die shoe, with a very simple arrangement.

The principal objects of my invention are to provide improved die sets better adapted to the requirements of practice and to effect economies in the manufacture of such die sets.

The nature of the invention and its advantages will be clear to those skilled in the art from the succeeding detailed description of the preferred embodiment of the invention and the accompanying drawings thereof.

DETAILED DESCRIPTION OF THE DRAWINGS

DETAILED DESCRIPTION OF THE SPECIFIC EMBODIMENT

Figure 1:
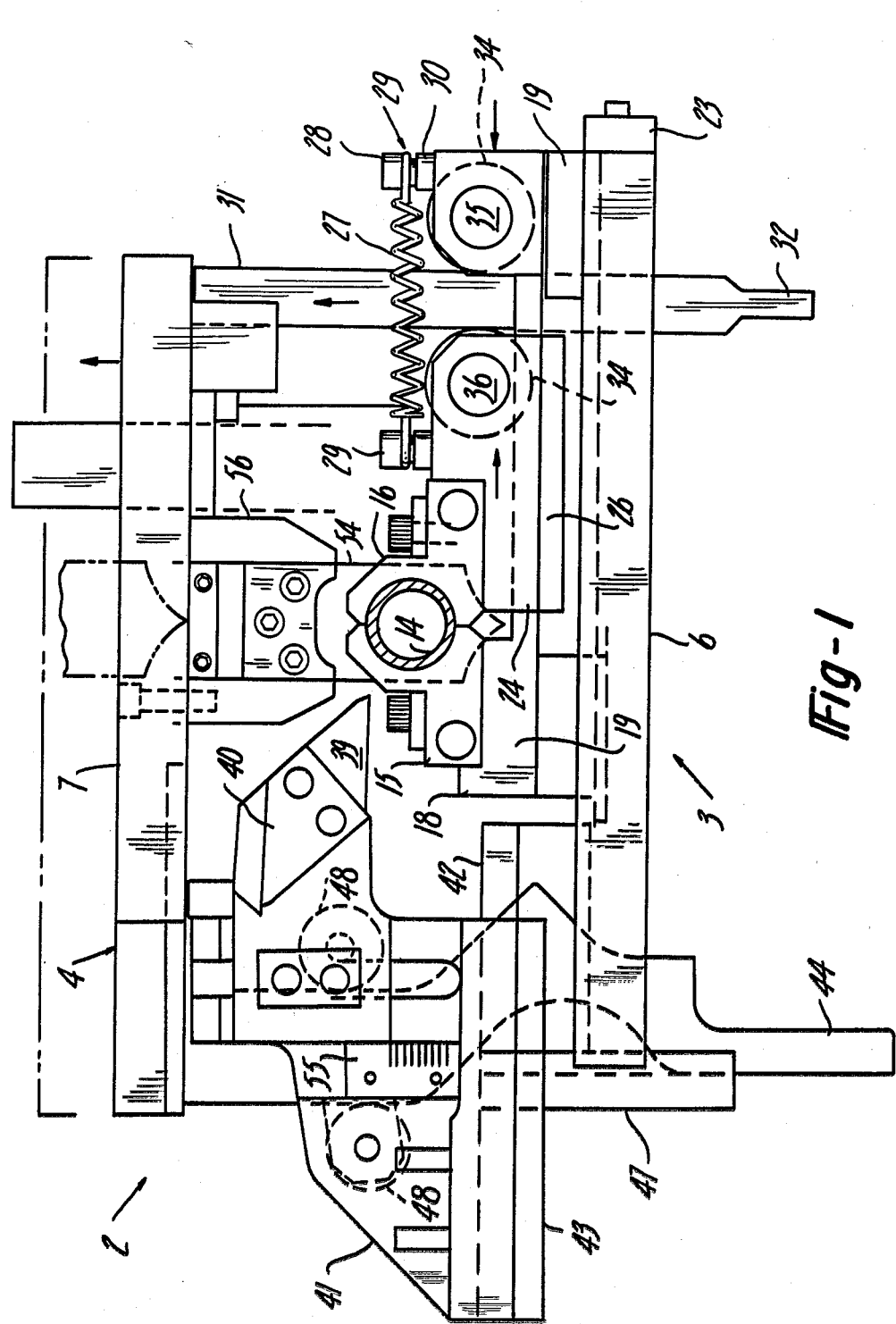
FIG. 1 is an elevation view of a die set embodying the invention.

Referring first to FIG. 1, the die set 2 includes a lower die 3 and an upper die 4. The lower die parts are mounted on a lower die shoe 6 and those of the upper die on an upper die shoe 7. These are heavy machined metal plates.

Figure 2:
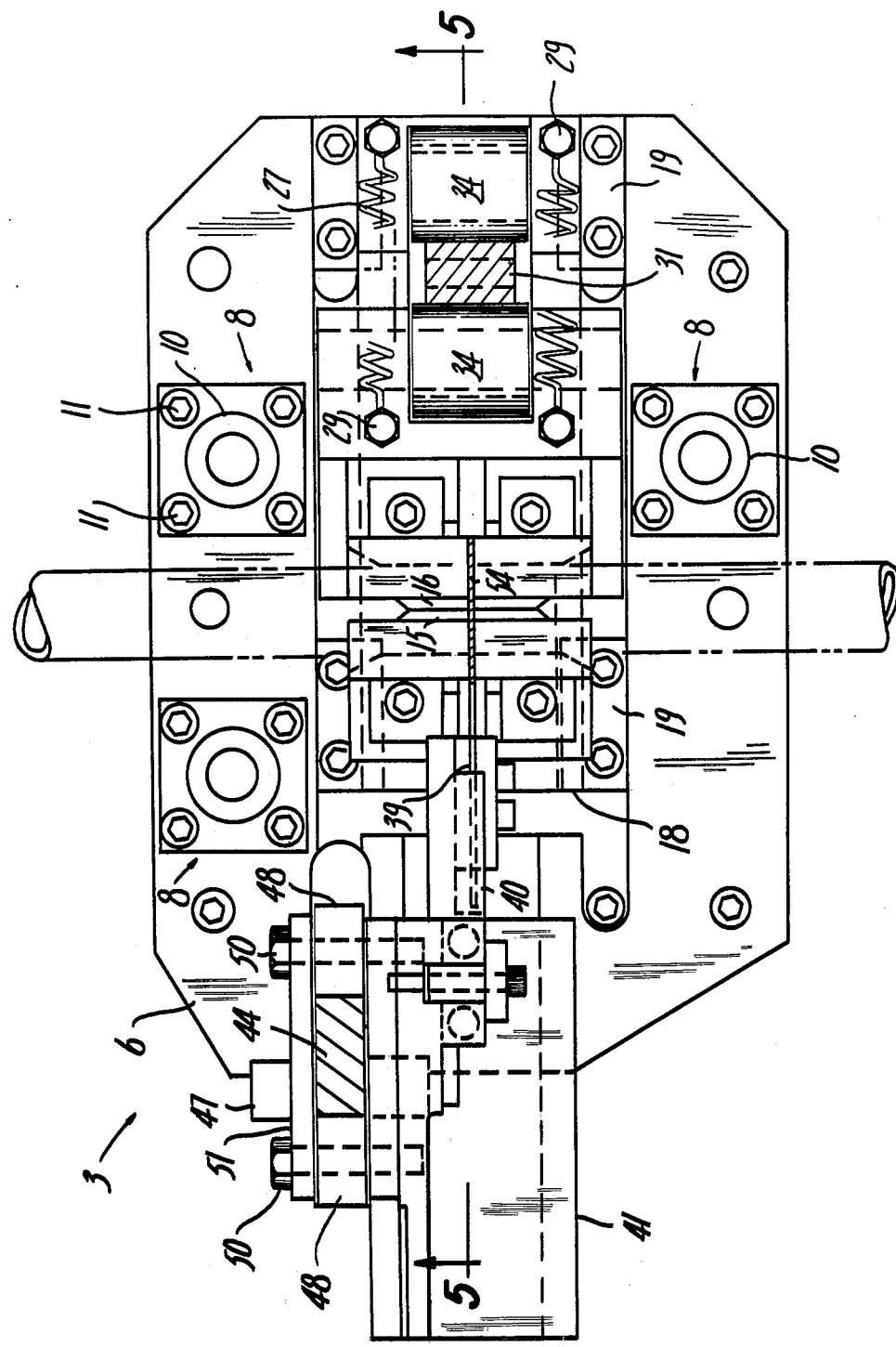
FIG. 2 is a plan view of the lower die shoe and parts mounted directly on it.

The lower shoe is supported by the bed of a press and the upper die shoe is reciprocated vertically by the ram of the press. The means by which the shoes ae connected to the press may follow customary practice and therefore will not be illustrated or described. The upper die will be considered as the movable die, although the lower die could be the one moved. The upper die is supported for such reciprocation on the lower die by three sets of guide means 8. Each guide means comprises a tubular guide post 10 having a flange fixed to the lower shoe 6 by socket head screws 11. A bushing 12 similarly fixed to the upper shoe 7 fits over the post. It will be most clearly apparent from FIG. 2 that the three guide posts 10 are located at three or four corners of a rectangle with the axes of two of the guide posts 10 lying in a plane which makes a vertical intersection with the plane of FIG. 2 whereas one of those pins and the third have axes which lie in a plane which makes a horizontal intercept with the plane of FIG. 2. This disposition of the guide means provides adequate support to resist any tendency of the die parts to bind because of sidewise thrust caused by lateral components of motion of the ram of the press with respect to the bed of the press.

It may be noted that the parts of the die are shown in their closed position, that is at the bottom of the closing stroke. It may also be noted that a portion of the structure is broken away in FIG. 1 to show the structure of the die set more clearly; specifically, the forward guide means 8 is omitted in that figure.

The tubing 14 which is being cut is gripped between two suitably contoured jaws 15 and 16. Jaw 15 is fixed by machine screws to a first jaw holder or cross slide 18 which is mounted on the shoe 6 to reciprocate from left to right as viewed in FIG. 1.

Figure 3:
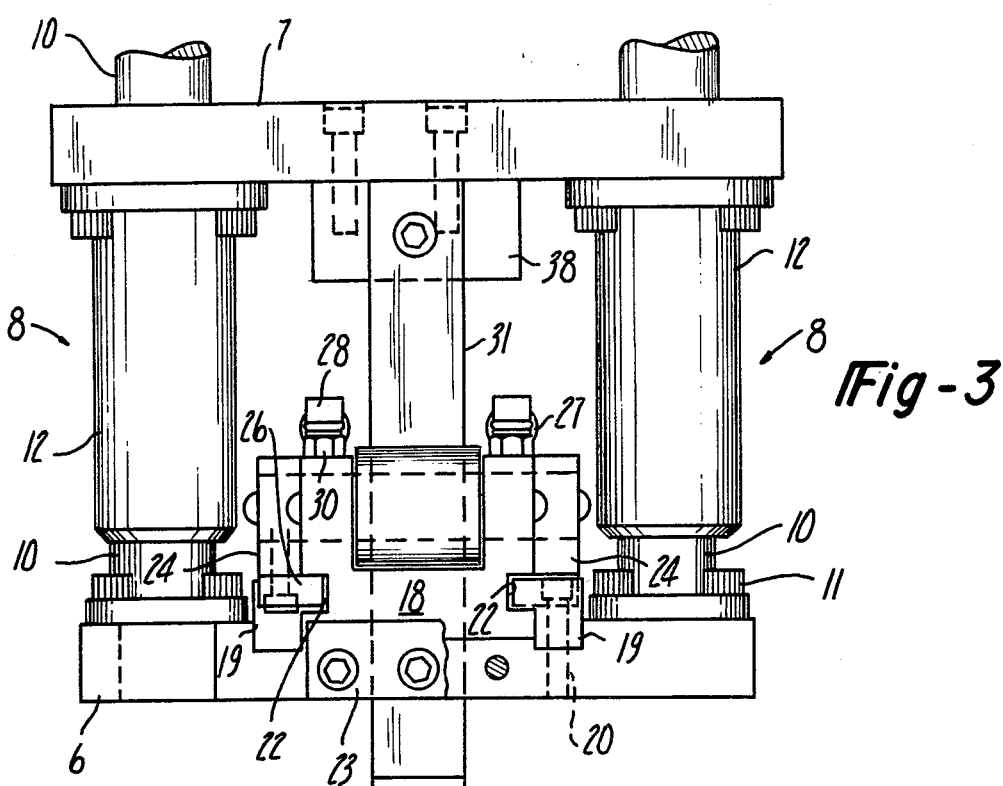
FIG. 3 is an elevation view as seen from the right hand side of FIG. 1.
Figure 4:
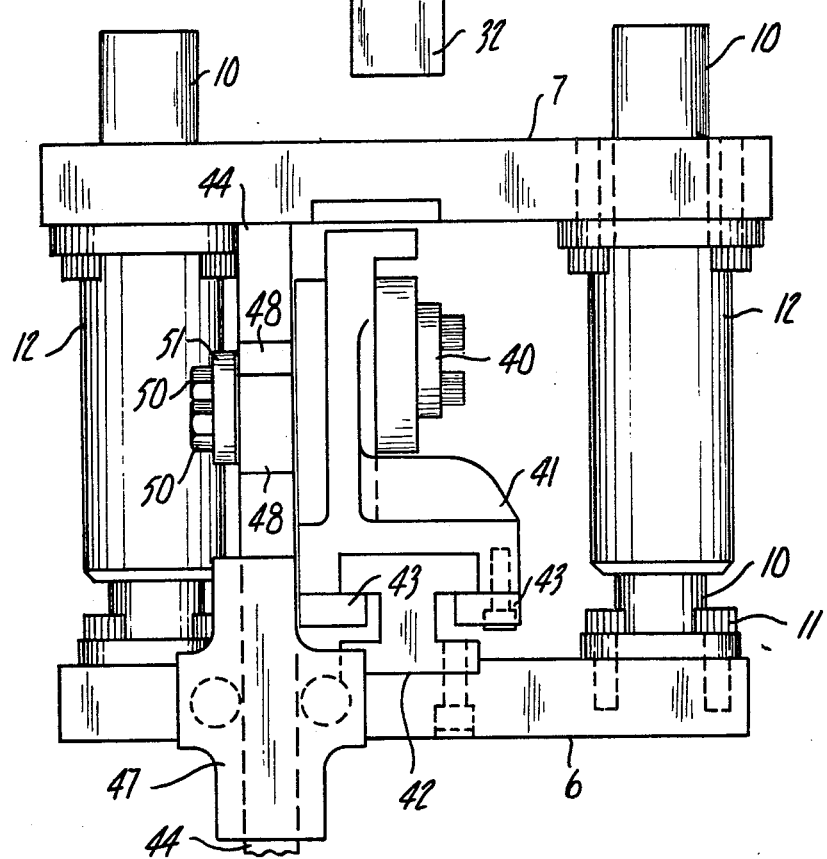
FIG. 4 is an elevation view as seen from the left hand side of FIG. 1.
Figure 5:
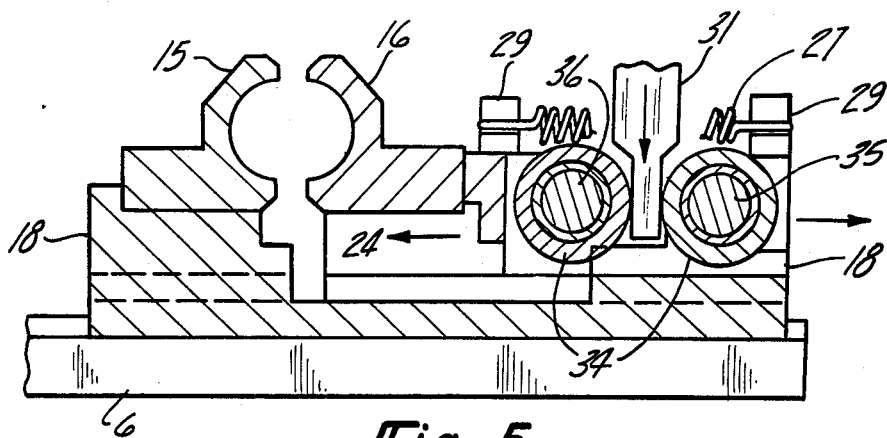
FIG. 5 is a vertical sectional view of the holding jaw mechanism taken on the plane indicated by the line 5—5 in FIG. 2.

The cross slide 18, which rides on a relieved portion of the upper surface of lower shoe 6, is guided and held down by four gibs 19 (FIGS. 1 and 3) received in a slot in the upper surface of the lower shoe and held in place by machine screws 20. These gibs, which are of L-shaped cross section, enter slots 22 in the sides of the slide 18. A stop plate 23 fixed to an end of the shoe 6 limits outward movement of the slide.

The jaw 16 is fixed to the second jaw holder or cross slide 24. The second slide is reciprocable on the upper surface of the slide 18 and is guided by two gibs 26 which enter the slots 22 between the gibs 19. Gibs 26 are fixed to the cross slide 24 by machine screws. The jaws 15 and 16 ae biased apart by two tension springs 27, the ends of which are hooked over posts 29. Each post consists of a sockethead screw 28 and a jam nut 30.

The jaws 15 and 16 are closed by a jaw clamping cam 31 which holds the jaws clamped during the greater part of the stroke of the ram. The cam 31 is fixed to the upper shoe 7 through a retainer 38. The parts are suitably fixed together by machine screws. Cam 31 has a thinner leading portion 32 which allows the springs 27 to open the jaws when the upper shoe is at its upper limit of travel. Cam 31 acts upon the slides through two rollers 34, one mounted on each slide, which follow the cam contours. One roller is mounted on slide 18 by a cross shaft 35 and the other on slide 24 by cross shaft 36. The operation of the clamping means in the cycle of operation of the cutoff die set should be apparent from the foregoing.

The first step in cutting off the tube is to scarf the upper surface; that is, to make a horizontal cut across the top of the tubing which extends only part way through the tube wall. This is a known expedient. The structure for this comprises a scarfing blade 39 clamped to a holder 40 mounted on a carrier or slide 41 reciprocable on an I-section rail 42 bolted into a recess in the lower shoe 6. The upper surface of the rail lies in a slot in the lower surface of the slide 41, and the slide is held on the rail by a pair of gibs 43 bolted to the under surface of the slide. The slide 41 is reciprocated on the rail 42 by a dogleg cam 44. Cam 44 depends from upper shoe 7, to which it is bolted. This cam passes through a slot in the lower shoe 6 and is backed up by a cam guide 47 fixed to one end of shoe 6. Cam 44 drives the slide 41 through two rollers 48, one engaging each edge of the cam. Shafts for these rollers are provided by two bolts 50. A plate 51 held by these bolts bears against the side of cam 44. As the upper die descends from its uppermost position (not illustrated) to its lowermost position as shown in FIG. 1, the dogleg portion 52 of cam 44 projects the scarfing blade 39 to notch the tubing and then retracts it so that it is out of the way of the blade 54 which completes the cut. The scarfing blade 59 is adjustable vertically to set it for tubing of different diameters. The holder 40 is adjustably fixed to the slide 41 and its vertical position may be read on a scale 55.

The upper end of the cutoff blade 54 is clamped to a blade holding block 56 which in turn is fixed to the upper shoe 7 by machine screws. The blade passes through opposed slots in the jaws 15 and 16.

The mounting arrangement for the cutoff blade 54 is illustrated particularly in FIGS. 6 through 10. This provides for mounting the blade in two longitudinally offset positions of the blade with respect to the die shoe 7 to accomodate two ranges of diameters of the tube to be cut off and to reposition a blade shortened by particularly after breakage.

Figures 6, 7:
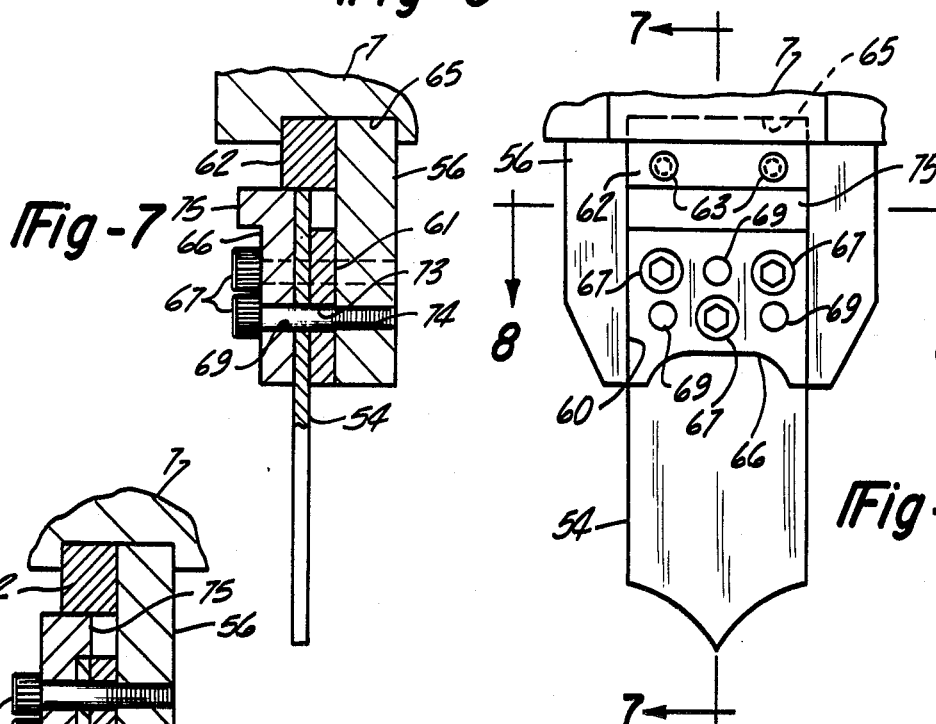
FIG. 6 is an elevation view of the cutoff blade and mounting means therefor.
FIG. 7 is a sectional view taken on the plane indicated by the line 7—7 in FIG. 6.

FIGS. 6 and 7 illustrate a first blade setting. Blade 54 lies in a recess 60 in the face of mounting block 56. A spacer plate 61 is disposed between the blade and the block. Plates 61 of various thickness are used with blades 54 of different thickness to locate the central plane of the blade at a point along the tube aligned with the scarfing blade 39.

The upper end of the blade 54 is driven downward by a backing plate or thrust block 62 which lies between shoe 7 and the end of the blade. Block 62 is fixed to holder 56 by machine screws 63 and both are received in a recess 65 in the under surface of shoe 7.

Blade 54 is held against the holder by a clamping plate 66. This plate is held against the blade by three sockethead screws 67 which pass through three of six holes 69 in the clamping plate and through lateral holes 70 and a lower central hole 71 (FIG. 10) in the blade in this setting. Screws 67 also pass through holes 73 in the spacer 61 and are received in threaded holes 74 in the mounting block 56. Holes 69, 73, and 74 lie in two horizontal rows of three holes each.

Figure 9:
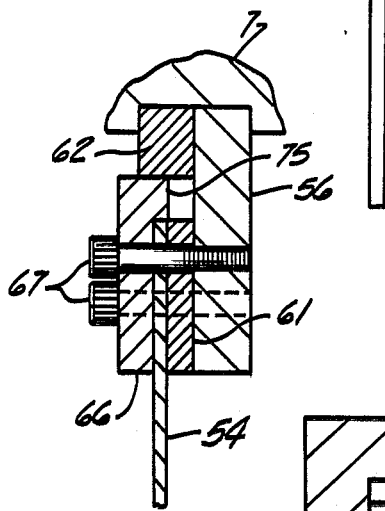
FIG. 9 is a view similar to FIG. 7 showing a different set-up of the blade mounting means.
Figure 8:
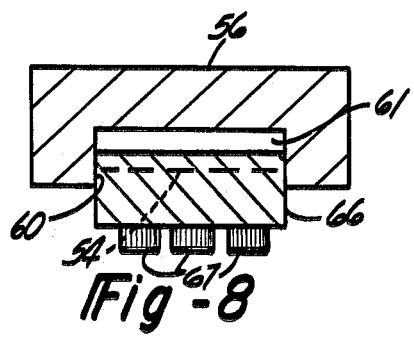
FIG. 8 is a sectional view taken on the plane indicated by the line 8—8 in FIG. 6.
Figure 10:
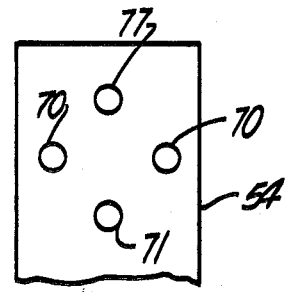
FIG. 10 is a partial elevation view of the cutoff blade.

To mount blade 54 farther from shoe 7, the screws 67 are taken out and clamping plate 66 is reversed as illustrated in FIG. 9. In this orientation of plate 66, a flange 75 on the clamping plate extends over the end of blade 54 and engages block 62 and the blade end to transmit the driving force to the blade. In this setting, screws 67 pass through the three holes 69, 73, 74 in parts 66, 61, and 56 which are not used in the other orientation of clamping plate 66. They pass through holes 70 and through an upper central hole 77 in the blade. Note that this arrangement of holes in the blade and the overall bolting arrangement avoid use of aligned holes across the blade which would result in a very considerably weaker blade structure.

Thus, with a very simple and easily assembled arrangement, the blade 54 is adequately supported and driven in either of two settings relative to shoe 7.

It will be clear to those skilled in the art that the preferred die structure described herein is highly versatile and advantageous and benefits from simplicity and economy.

The guiding arrangement between the die shoes, the workpiece clamping structure, and the blade mounting arrangement all contribute to the advantages of the assembly.

While the invention has been described with reference to a specific embodiment, it is to be understood that various modifications and additions to the invention are possible and will occur to those skilled in the art. Accordingly, the foregoing description is not to be construed in a limiting sense.

The embodiments of the invention in which an exclusive property or privilege is claimed are defined as follows:

1. In a cutoff die set including two relatively movable die shoes, and a cutoff blade mounted to one of said die shoes so as to be driven thereby, an improved mounting arrangement for said cutoff blade comprising:

means for mounting said cutoff blade;

mounting means for alternatively mounting said cutoff blade in a longitudinally offset position with respect to said one die shoe;

said mounting arrangement including a thrust surface fixed with respect to said die shoe engaging an end surface of said cutoff blade opposite the cutting edge in a first mounted position of said cutoff blade;

a clamping plate having a surface adapted to be interposed between said end surface and said thrust surface and in engagement with both of said surfaces in a second longitudinally offset position of said cutoff blade;

whereby said blade may be adapted to cutting different dimensioned workpieces along the direction of said longitudinal axis, and may be resharpened after breakage thereof.

2. In a cutoff die set including two relatively movable die shoes, and a cutoff blade mounted to one of said die shoes so as to be driven thereby, an improved mounting arrangement for said cutoff blade comprising:

means for mounting said cutoff blade;

mounting means for alternatively mounting said cutoff blade in a longitudinally offset position with respect to said one die shoe;

said mounting arrangement including a clamping plate and a mounting block secured to said one die shoe, said cutoff blade mounted therebetween;

aligned hole patterns formed in said mounting block and said clamping plate, said patterns each comprising at least two hole series extending transversely to the length of said cutoff blade mounted therein;

a hole pattern formed in said cutoff blade comprised of a transversely spaced pair of holes and at least one other hole longitudinally spaced on either side of said pair of holes;

said pair of holes and a respective one of said longitudinally spaced holes aligning said holes in said mounting block and clamping plate pattern in respective longitudinally offset positions of said cutoff blade mounted therein;

a plurality of screws passing through said aligned holes in said hole pattern in said clamping plate, said mounting block and said cutoff blade;

whereby said blade may be adapted to cutting different dimensioned workpieces along the direction of said longitudinal axis, and may be resharpened after breakage thereof.

* * * * *